(12) United States Patent
Feng et al.

(10) Patent No.: US 10,734,808 B2
(45) Date of Patent: Aug. 4, 2020

(54) METHOD FOR CONTROLLING A VARIABLE TRANSFORMER AND ELECTRICAL SYSTEM FOR COUPLING TWO AC NETWORKS

(71) Applicant: Maschinenfabrik Reinhausen GmbH, Regensburg (DE)

(72) Inventors: Haijun Feng, Regenstauf (DE); Alexei Babizki, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 51 days.

(21) Appl. No.: 16/072,508

(22) PCT Filed: Jan. 30, 2017

(86) PCT No.: PCT/EP2017/051915
§ 371 (c)(1),
(2) Date: Jul. 26, 2018

(87) PCT Pub. No.: WO2017/140479
PCT Pub. Date: Aug. 24, 2017

(65) Prior Publication Data
US 2019/0067944 A1 Feb. 28, 2019

(30) Foreign Application Priority Data
Feb. 15, 2016 (DE) .................. 10 2016 102 593 U

(51) Int. Cl.
*G05D 3/12* (2006.01)
*G05D 5/00* (2006.01)
(Continued)

(52) U.S. Cl.
CPC .............. *H02J 3/06* (2013.01); *G05B 13/048* (2013.01); *H02J 3/1878* (2013.01); *H02J 3/24* (2013.01); *H02J 2203/20* (2020.01); *Y02E 40/30* (2013.01)

(58) Field of Classification Search
CPC . H02J 3/06; H02J 3/24; H02J 2003/00; G05B 13/04; Y02E 40/30
(Continued)

(56) References Cited

U.S. PATENT DOCUMENTS 5,530,338 A * 6/1996 Beckwith .................. G05F 1/14
323/255
2011/0066301 A1* 3/2011 Donolo ..................... H02J 3/12
700/292
(Continued)

FOREIGN PATENT DOCUMENTS

| EP | 1134867 B1 | 9/2001 |
|---|---|---|
| EP | 1211775 A1 | 6/2002 |
| GB | 2521414 A | 6/2015 |

OTHER PUBLICATIONS

Le Fu et al: "Phasor measurement application for power system voltage stability monitoring", Power and Energy Society General Meeting—Conversion and Delivery of Electrical Energy in the 21$^{st}$ Century, 2008 IEEE, IEEE Piscataway, NJ, USA, Jul. 20, 2008 (Jul. 20, 2008), pp. 1-8, XP031303877.
(Continued)

*Primary Examiner* — Md Azad
(74) *Attorney, Agent, or Firm* — Leydig, Voit & Mayer, Ltd.

(57) ABSTRACT

A method of controlling a regulating transformer with a settable translation ratio, switchable between a first and second AC-mains includes the following operations: detecting phasor data of phasors of the first and/or second AC-mains; determining an equivalent circuit diagram with
(Continued)

equivalent circuit diagram parameters for the first AC-mains; determining a load model with load model parameters for the second AC-mains; determining the equivalent circuit diagram parameters and the load model parameters from the phasor data; and when switching over to a desired translation ratio is to take place: predicting a working point of the second AC-mains for the desired translation ratio; checking a stability criterion in the second AC-mains for the predicted working point; and switching over to the desired translation ratio is carried out upon the stability criterion being fulfilled, but otherwise not switching over to the desired translation ratio.

14 Claims, 2 Drawing Sheets

(51) Int. Cl.
| | |
|---|---|
| *G05D 9/00* | (2006.01) |
| *G05D 11/00* | (2006.01) |
| *G05D 17/00* | (2006.01) |
| *H02J 3/06* | (2006.01) |
| *H02J 3/18* | (2006.01) |
| *H02J 3/24* | (2006.01) |
| *G05B 13/04* | (2006.01) |

(58) Field of Classification Search
USPC .......................................................... 700/291
See application file for complete search history.

(56) References Cited

U.S. PATENT DOCUMENTS

| | | |
|---|---|---|
| 2013/0119950 A1 | 5/2013 | Nelson |
| 2015/0378387 A1* | 12/2015 | Chow ................ G05B 19/048 |
| | | 307/18 |
| 2016/0380433 A1* | 12/2016 | Wang ................... G01R 31/40 |
| | | 307/130 |

OTHER PUBLICATIONS

Bahadornejad Momen et al: "Intelligent Control of On-Load Tap Changing Transformer", IEEE Transactions on Smart Grid, IEEE, USA, vol. 5, No. 5, Sep. 1, 2014 (Sep. 1, 2014), pp. 2255-2263.
Bartosz Brusilowicz et al: "A new method of voltage stability margin estimation based on local measurements", Advanced Power System Automation and Protection (APAP); 2011 International Conference on, IEEE, Oct. 16, 2011 (Oct. 16, 2011), pp. 2443-2447, XP032162662.
M.H. Haque: "On-line monitoring of maximum permissible loading of a power system within voltage stability limits", IEEE Proceedings: Generation, Transmission and Distribution, vol. 150, No. 1, Jan. 1, 2003 (Jan. 1, 2003), p. 107, XP055357654.

* cited by examiner

METHOD FOR CONTROLLING A VARIABLE TRANSFORMER AND ELECTRICAL SYSTEM FOR COUPLING TWO AC NETWORKS

CROSS-REFERENCE TO PRIOR APPLICATIONS

This application is a U.S. National Stage Application under 35 U.S.C. § 371 of International Application No. PCT/EP2017/051915 filed on Jan. 30, 2017, and claims benefit to German Patent Application No. DE 10 2016 102 593.3 filed on Feb. 15, 2016. The International Application was published in German on Aug. 24, 2017 as WO 2017/140479 A1 under PCT Article 21(2).

FIELD

The invention relates to a method of controlling a regulating transformer and to an electrical installation for coupling two alternating current mains.

BACKGROUND

The shutdown of large power stations and setting up at the same time of an increasing number of renewable energy plants and the associated growing proportion of fluctuating power supply causes increasing deterioration of mains stability and increases the risk of black-outs. The inventors have recognized that this presents substantial challenges not only to distributing mains operators, but also transmission mains operators. Instabilities of that kind, as caused by fluctuating power supply, in a distributing mains can penetrate the transmission mains by way of the regulating transformer coupled to these mains and are therefore to be avoided as far as possible.

EP 1 134 867 B1 describes a system protection centre for an electrical energy supply mains and a method for assessing the stability of an electrical energy supply mains, where the mains includes a plurality of substations, buses and lines and a system protection centre. This method includes the following steps: transmitting substation data with respect to the state of switches of at least one substation to the system protection centre; measuring phasor data for voltages and currents at a plurality of locations of the mains; transmitting the phasor data to the system protection centre; the system protection centre determines from the phasor data and the substation data at least one power, voltage or impedance stability margin value as a measure of the stability of the supply mains; the system protection centre determines one or more control commands; the system protection centre transmits the control commands to the at least one substation; the substation executes the control commands; the system protection centre determines mains state data; the system protection centre transmits the mains state data to an energy management system; and the energy management system controls power generation and power flow within the mains in accordance with the mains state data.

In this method, the energy management system collects the substation data from a plurality of substations. The energy management system controls power generation and power flow within the mains on the basis of this collected data in that it transmits control commands to the substations. In this method, the system protection centre receives phasor data from phasor measuring units which are located at supply lines of several substations and/or at branch points along transmission lines. In this method, phasor data of phasor measuring units, which are distributed over a large geometric area of hundreds of kilometres, are collected. In this method, determination of the stability of the supply mains is carried in accordance with a method from VU, K. ET AL: "USE OF LOCAL MEASUREMENTS TO ESTIMATE VOLTAGE-STABILITY MARGIN" (POWER INDUSTRY COMPUTER APPLICATIONS (PICA), IEEE, 12-16 May 1997).

VU, K. ET AL: "USE OF LOCAL MEASUREMENTS TO ESTIMATE VOLTAGE-STABILITY MARGIN" (POWER INDUSTRY COMPUTER APPLICATIONS (PICA), IEEE, 12-16 May 1997) describes a method that determines the stability of a transmission mains. This method uses a load model for a load rail ("load bus") of the transmission mains and treats the rest of the transmission mains as a Thévenin equivalent. In this method the load model defines the load impedance by: $\underline{Z}_{app}=\underline{u}(t)/\underline{i}(t)$ and uses $|\underline{Z}_{app}|>|\underline{Z}_{Thev}|$ as stability criterion, wherein $\underline{Z}_{Thev}$ is the Thévenin impedance.

SUMMARY

An embodiment of the present invention provides a method of controlling a regulating transformer with a settable translation ratio, which is capable of being switched between a first alternating current mains and a second alternating current mains. The method includes: detecting phasor data of phasors of the first alternating current mains and/or the second alternating current mains; determining an equivalent circuit diagram with equivalent circuit diagram parameters for the first alternating current mains; determining a load model with load model parameters for the second alternating current mains; determining the equivalent circuit diagram parameters and the load model parameters from the phasor data; and when switching over to a desired translation ratio is to take place: predicting a working point of the second alternating current mains for the desired translation ratio; checking a stability criterion in the second alternating current mains for the predicted working point; and switching over to the desired translation ratio is carried out upon the stability criterion being fulfilled, but otherwise not switching over to the desired translation ratio.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
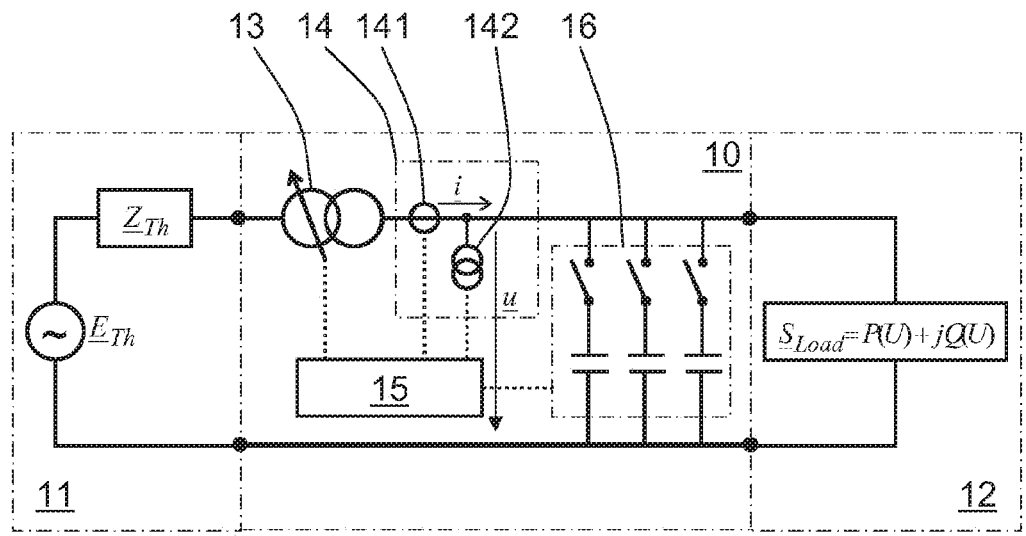
FIG. 1 shows an embodiment of an electrical installation for coupling two alternating current mains, and an embodiment of a method for controlling the regulating transformer.

In the following, an expression of the kind "A is coupled to B" corresponds with an expression of the kind "A is connected with B", an expression of the kind "A is connected with B" embraces the meanings "A is directly electrically conductively connected with B" and "A is indirectly electrically conductively connected with B, thus by way of C'" and an expression of the kind "A is attached to B" has the meaning "A is directly electrically conductively connected with B".

According to an embodiment, the present invention provides a method of controlling a regulating transformer with settable translation ratio, which is switched between a first alternating current mains and a second alternating current mains. Here, the phasor data of phasors of the first and second alternating current mains are detected. An equivalent circuit diagram with equivalent circuit diagram parameters is determined or selected for the first alternating current mains. A load model with load model parameters is determined or selected for the second alternating current mains. The equivalent circuit diagram parameters and the load model parameters are determined from the phasor data. When switching over to a desired translation ratio is to take place, a working point of the second alternating current mains is predicted for the desired translation ratio; a stability criterion in and/or for the second alternating current mains is checked for the predicted working point; and switching over to the desired translation ratio is carried out if the stability criterion is fulfilled, but otherwise not.

Switching over to a desired translation ratio shall then usually take place when, for example, a predetermined voltage band is violated.

Another embodiment of the present invention provides an electrical installation for coupling two alternating current mains, which includes the following. A regulating transformer with a settable translation ratio, which is or can be connected between a first current mains and a second current mains. A measuring device that can detect alternating current magnitudes, particularly alternating current magnitudes of the first and/or second current mains. In particular, the alternating current magnitudes are characteristic for phasor data, particularly the phasor data of the first and/or second alternating current mains, and/or from which magnitudes it is possible to determine phasor data, particularly the phasor data of the first and/or second alternating current mains. A control device that is coupled to the measuring device and, for controlling the regulating transformer, to the regulating transformer. The control device is configured such that it determines the phasor data of phasors of the first and/or second alternating current mains from the alternating current magnitudes; determines or selects an equivalent circuit diagram with equivalent circuit diagram parameters for the first alternating current mains; determines or selects a load model with load model parameters for the second alternating current mains; determines the equivalent circuit diagram parameters and the load model parameters from the phasor data; monitors the phasor data, and depending on the respective monitoring result, provides, with the help of the phasor data, a switch-over signal containing a desired translation ratio. If the switching-over signal is provided, the control device: predicts for the desired translation ratio a working point of the second alternating current mains; checks for the predicted working point a stability criterion in the second alternating current mains and/or for the second alternating current mains; and transmits the switch-over signal to the regulating transformer if the stability criterion is fulfilled, but otherwise not.

Embodiment of the present invention provide early recognition of mains problems without having to bear a large additional outlay primarily connected with the so-called "remote sensors", which according to EP 1 134 867 B1 are used by methods and system protection centres and are there termed phasor measuring units. This is because embodiments of the invention manage with "local sensors", which are already present at a regulating transformer since they are used for regulation thereof and are, for example, simple and inexpensive analog-to-digital converters.

In addition, embodiments of the invention make possible an autonomous reaction of the regulating transformer for the avoidance or at least reduction and delay of a possible stability problem without data having to be sent to a remote management device in a control room and control signals having to be received from this, since the embodiments of the invention prevent the regulating transformer from switching over to another translation ratio and thus changing the voltage if the second alternating current mains would, as a result, transition to an unstable state.

Phasor data represent the phasors, which are used in complex alternating current computation, for voltage and amperage and can be determined, for example, in mode and manner by time-resolved measurement of voltage and amperage. Electrical variables such as, for example, voltage, amperage, phase displacement angle, power factor, effective factor, apparent power, effective power, reactive power, impedance, apparent resistance, effective resistance or reactive resistance, can be calculated from the phasor data. The phasor data are advantageously collated into appropriate phasor data sets.

For preference, the phasor data are determined at the regulating transformer and/or the alternating current magnitudes required for the phasor data are detected at the regulating transformer.

The mentioned time-resolved measurement of voltage and amperage is preferably carried out in known mode and manner at the input terminals of the regulating transformer, at which it can be connected with the first alternating current mains and/or at its output terminals, at which it can be connected with the second alternating current mains and/or at lines which are coupled or attached to these terminals.

Each alternating current mains can be constructed in any mode and manner according to requirements. Thus, for example, the first alternating current mains can be a transmission mains which is operated by a transmission mains operator at high-voltage level at, for example, 60 kV to 150 kV or 110 kV and the second alternating current mains can be a distributing mains which is operated by a distributing mains operator at medium voltage level at, for example, 1 kV to 35 kV or 20 kV to 25 kV or 10 kV. Alternatively, for example, the first alternating current mains can be a transmission mains which is operated by a transmission mains operator at an extra-high voltage level at, for example, 230 kV or 400 kV or 735 kV or 765 kV or 750 kV or 500 kV, and the second alternating current mains can be a transmission mains which is operated by a transmission mains operator at high voltage level at, for example, 60 kV to 150 kV or 110 kV. Alternatively, for example, the first alternating current mains can be a distributing mains which is operated by a distributing mains operator at medium voltage level at, for example, 1 kV to 35 kV or 20 kV to 25 kV or 10 kV and the second alternating current mains can be a local mains or municipal mains which is operated by a distributing mains operator at low voltage level at, for example, 230 V or 400 V.

The equivalent circuit diagram can be formed in any mode and manner according to requirements.

In one embodiment, it is specified that the equivalent circuit diagram is formed in accordance with the Thévenin theorem or the Norton theorem.

The equivalent circuit diagram parameters can be determined in any mode and manner according to requirements.

In one embodiment, it is specified that: the equivalent circuit diagram parameters are determined in that the phasor data and optionally the translation ratios are determined and collated for a predetermined number M of time instants; a target function is determined or selected with use of the collated phasor data and optionally the translation ratios; and/or the equivalent circuit diagram parameters are calculated by minimisation of the target function.

The phasor data needed for determination of the target function are preferably collated only when the load has changed by a predetermined amount.

The target function can be determined and/or selected and/or formed in any desired mode and manner according to requirements.

In one embodiment it is specified that for the Thévenin theorem as time function:

$$L = \sum_{k=1}^{M} \left\{ \left(\frac{E_{Th}}{\ddot{u}}\right)^2 - [u_k^2 + 2Z(P_k\cos\vartheta + Q_k\sin\vartheta) + (Zi_k)^2] \right\}^2$$

with the secondary conditions:

$EU \leq E_{Th} \leq EO$, wherein $EU < 1$ and $EO > 1$ $Z > 0$ $TU \leq \tan\vartheta \leq TO$ is selected;
- ü is the translation ratio, which is preferably constant or assumed as constant;
- ZDk is a phasor data set containing the phasor data collated at a k-th time instant (wherein k=1 . . . M);
- $P_k$ is the effective power calculated from the phasor data set ZDk;
- $Q_k$ is the reactive power calculated from the phasor data set ZDk;
- $i_k$ is the amperage calculated from the phasor data set ZDk;
- $u_k$ is the voltage calculated from the phasor data set ZDk;
- $E_{Th}$ is the Thévenin voltage;
- a total impedance, which describes the first alternating current mains (11) and the regulating transformer (13), is defined by:

$$\underline{Z} = Z \cdot e^{j\vartheta} = \frac{\underline{Z}_{Th} + \underline{Z}_{Trf}}{\ddot{u}^2}$$

- $\underline{Z}_{Th}$ is the Thévenin impedance;
- $\underline{Z}_{Trf}$ is the impedance of the regulating transformer (13);
- Z is the apparent impedance of the total impedance;
- $\vartheta$ is the phase angle of the total impedance;
- Z, $\vartheta$ and $E_{Th}$ are the substitute circuit diagram parameters;
- EU and EO are predetermined lower and upper limit values; and
- TU and TO are predetermined lower and upper limit values.

In one embodiment it is specified that:
EU is set, in particular according to requirements, to 0.6 or 0.7 or 0.8 or 0.9; and/or
EO is set, in particular according to requirements, to 1.1 or 1.15 or 1.2 or 1.25 or 1.3 or 1.4; and/or
TU is set, in particular according to requirements, to a value less than 10 or to 9 or 8.5 or 8 or 7.5 or 7 or 6.5 or 6 or 5.5 or 5 or 4.5 or 4 or 3.5 or 3 or 2.5 or 2; and/or TO is set, in particular according to requirements, to a value greater than 12 or to 13 or 13.5 or 14 or 14.5 or 15 or 15.5 or 16 or 16.5 or 17 or 18 or 18 or 19 or 20.

In one embodiment it is specified that:
the load model models the second alternating current mains as a voltage-dependent total load; and/or
the load model describes the effective power and the reactive power of the second alternating current mains in dependence on the applied voltage.

By contrast thereto VU, K. ET AL: "USE OF LOCAL MEASUREMENTS TO ESTIMATE VOLTAGE-STABILITY MARGIN" (POWER INDUSTRY COMPUTER APPLICATIONS (PICA), IEEE, 12-16 May 1997) teaches that the load model describes the power of the load rail independently of the applied voltage.

The load model can be modeled and/or formed in any mode and manner according to requirements.

In one embodiment it is specified that the load model is modeled in that:
for a predetermined number N of switchings-over to a desired translation ratio the phasor data are determined and collated before and after each of these switchings-over;
a first target function for the effective power and a second target function for the reactive power are determined or selected with use of the collated phasor data;
the load model parameters are calculated by minimisation of the target functions.

The load model can be determined and/or selected and/or formed in desired mode and manner according to requirements.

In one embodiment it is specified that the load model is an exponential load model or a polynomial load model or a combined load model.

Each of the two target functions can be determined and/or selected and/or formed in any mode and manner according to requirements.

In one embodiment it is specified that for the first exponential load model there is selected as first target function:

$$J = \sum_{k=1}^{N} \left[ \frac{P_{1,k}}{P_{2,k}} - \left(\frac{u_{1,k}}{u_{2,k}}\right)^x \right]^2$$

and as second target function:

$$K = \sum_{k=1}^{N} \left[ \frac{Q_{1,k}}{Q_{2,k}} - \left(\frac{u_{1,k}}{u_{2,k}}\right)^y \right]^2$$

with the secondary conditions:

$0 \leq x \leq 2$ $0 \leq y \leq YO;$

- $P_{1,k}$ is the effective power, which is calculated from the collated phasor data, before the k-th switching-over process;
- $P_{2,k}$ is the effective power, which is calculated from the collated phasor data, after the k-th switching-over process;
- $Q_{1,k}$ is the reactive power, which is calculated from the collated phasor data, before the k-th switching-over process;

$Q_{2,k}$ is the reactive power, which is calculated from the collated phasor data, after the k-th switching-over process;

$u_{1,k}$ is the voltage, which is calculated from the collated phasor data, before the k-th switching-over process;

$u_{2,k}$ is the voltage, which is calculated from the collated phasor data, after the k-th switching-over process;

x, y are the load model parameters;

YO is a predetermined upper limit value.

In one embodiment it is specified that:

for the polynomial load model there is selected as first target function:

$$J = \sum_{k=1}^{N} \left\{ \left[ u_{1,k}^2 - \frac{P_{1,k}}{P_{2,k}} u_{2,k}^2 \right] x_1 + \left[ u_{1,k} - \frac{P_{1,k}}{P_{2,k}} u_{2,k} \right] x_2 + \left[ 1 - \frac{P_{1,k}}{P_{2,k}} \right] x_3 \right\}^2$$

and as second target function:

$$K = \sum_{k=1}^{N} \left\{ \left[ u_{1,k}^2 - \frac{Q_{1,k}}{Q_{2,k}} u_{2,k}^2 \right] y_1 + \left[ u_{1,k} - \frac{Q_{1,k}}{Q_{2,k}} u_{2,k} \right] y_2 + \left[ 1 - \frac{Q_{1,k}}{Q_{2,k}} \right] y_3 \right\}^2$$

with the secondary conditions:

$0 \le x_i \le 1$ and $0 \le y_i \le 1$, wherein $i = 1 \ldots 3$ $x_1 + x_2 + x_3 = y_1 + y_2 + y_3 = 1$;

$P_{1,k}$ is the effective power, which is calculated from the collated phasor data, before the k-th switching-over process;

$P_{2,k}$ is the effective power, which is calculated from the collated phasor data, after the k-th switching-over process;

$Q_{1,k}$ is the reactive power, which is calculated from the collated phasor data, before the k-th switching-over process;

$Q_{2,k}$ is the reactive power, which is calculated from the collated phasor data, after the k-th switching-over process;

$u_{1,k}$ is the voltage, which is calculated from the collated phasor data, before the k-th switching-over process;

$u_{2,k}$ is the voltage, which is calculated from the collated phasor data, after the k-th switching-over process;

$x_i$, $x_j$, $y_i$, $y_j$ are the load model parameters.

In one form of embodiment it is specified that:

for the combined load model there is selected as first target function:

$$J = \sum_{k=1}^{N} \left\{ \left[ u_{1,k}^{x_4} - \frac{P_{1,k}}{P_{2,k}} u_{2,k}^{x_4} \right] x_1 + \left[ u_{1,k}^{x_5} - \frac{P_{1,k}}{P_{2,k}} u_{2,k}^{x_5} \right] x_2 + \left[ u_{1,k}^{x_6} - \frac{P_{1,k}}{P_{2,k}} u_{2,k}^{x_6} \right] x_3 \right\}^2$$

and as second target function:

$$K = \sum_{k=1}^{N} \left\{ \left[ u_{1,k}^{y_4} - \frac{Q_{1,k}}{Q_{2,k}} u_{2,k}^{y_4} \right] y_1 + \left[ u_{1,k}^{y_5} - \frac{Q_{1,k}}{Q_{2,k}} u_{2,k}^{y_5} \right] y_2 + \left[ u_{1,k}^{y_6} - \frac{Q_{1,k}}{Q_{2,k}} u_{2,k}^{y_6} \right] y_3 \right\}^2$$

with the secondary conditions:

$0 \le x_i \le 1$ and $0 \le y_i \le 1$, wherein $i = 1 \ldots 3$ $0 \le x_j$ and $0 \le y_j$, wherein $j = 4 \ldots 6$ $x_1 + x_2 + x_3 = y_1 + y_2 + y_3 = 1$;

$P_{1,k}$ is the effective power, which is calculated from the collated phasor data, before the k-th switching-over process;

$P_{2,k}$ is the effective power, which is calculated from the collated phasor data, after the k-th switching-over process;

$Q_{1,k}$ is the reactive power, which is calculated from the collated phasor data, before the k-th switching-over process;

$Q_{2,k}$ is the reactive power, which is calculated from the collated phasor data, after the k-th switching-over process;

$u_{1,k}$ is the voltage, which is calculated from the collated phasor data, before the k-th switching-over process;

$u_{2,k}$ is the voltage, which is calculated from the collated phasor data, after the k-th switching-over process;

$x_i$, $x_j$, $y_i$, $y_j$ are the load model parameters.

In one embodiment it is specified that YO is set, in particular according to requirements, to a value greater than 3 or to 4 or 4.5 or 5 or 5.5 or 6 or 6.5 or 7 or 7.5 or 8 or 8.5 or 9 or 9.5 or 10 or 11.

The working point can be predicted in any mode and manner according to requirements.

In one embodiment it is specified that the working point is predicted with the help of a load flow calculation.

The stability criterion can be determined and/or selected and/or checked and/or formed in any mode and manner according to requirements.

In one embodiment it is specified that the stability criterion is checked with the help of a load flow calculation.

In one embodiment it is specified that:

the stability margin is checked in that:

a stability margin $\Delta P$ is determined for the instantaneous state of the second alternating current mains;

for the predicted working point it is checked whether $P_G - P' > \Delta P$ is applicable;

$P_G$ is the limit effective power of the P-U plot;

P' is the effective power of the predicted working point.

The limit effective power is the largest effective power of the P-U plot and lies at the limit point of the P-U plot, at which the second alternating current mains is overloaded.

In this check the effective power P is evaluated. Alternatively or additionally the stability criterion can be checked, for example also through analogous evaluation of the reactive power.

The stability margin can be determined and selected and/or formed in any mode and manner according to requirements.

In one embodiment it is specified that:

as stability margin $\Delta P = P_G - P_H$ is selected;

$P_H$ is the Hopf effective power of the P-U plot.

The Hopf effective power lies at the Hopf point of the P-U plot, at which the second alternating current mains is unstable.

This stability margin thus depends on the effective power P. Alternatively or additionally, however, it can also depend on the reactive power Q and/or the apparent power S and/or the power factor or effective factor.

In one embodiment it is specified that:
the stability criterion is checked in that:
a stability margin ΔP is determined for the current state (A) of the second alternating current mains (12);
for the predicted working point (A) it is checked whether $$P_G - P' > \Delta P$$

is applicable;

$P_G$ is the limit effective power of the P-U plot;
P' is the effective power of the predicted working point (A);
the stability margin is determined with the help of a load flow calculation; and/or
the stability criterion is checked in dependence on the first derivation U'(P) and/or on the amount of the first derivation |U'(P)| and/or on the second derivation U"(P) and/or on the amount of the second derivation |"(P)| of the P-U plot.

In one embodiment it is specified that, in particular before determination of the load model parameters and/or after each switching-over process,
a state change criterion for the state of the first alternating current mains is checked;
if the state change criterion is fulfilled, determination of the equivalent circuit diagram parameters is repeated or carried out afresh.

For preference, for this fresh determination of the equivalent circuit diagram parameters use is made of only those phasor data which have been measured after the state change.

The state change criterion can be determined and/or selected and/or checked and/or formed in any mode and manner according to requirements.

In one embodiment it is specified that:
a total impedance describing the first alternating current mains and the regulating transformer is defined by $$Z = R + jX = \frac{Z_{Th} + Z_{Trf}}{u^2}$$

$\underline{Z}_{Th}$ is the Thévenin impedance;
$\underline{Z}_{Trf}$ is the impedance of the regulating transformer;
R is the effective resistance of the total impedance;
X is the reactive resistance of the total impedance;
ZDi is a phasor data set containing the phasor data collated at an i-th time instant;
the state change criterion is checked in that
the voltage $u_i$, the amperage $i_i$, the effective power $P_i$ and the reactive power $Q_i$, wherein i=1 . . . 4, are respectively calculated from the youngest phasor data set ZD1 and the three preceding phasor data sets ZD2, ZD3 and ZD4;
it is checked whether at least one of the following conditions $$E_1^2 - 4D_1F_1 \geq 0$$

$$\Delta X < XO$$

is applicable;
the following definitions are used:

$$A_1 = (u_1^2 - u_2^2)(i_1^2 - i_3^2) - (u_1^2 - u_3^2)(i_1^2 - i_2^2)$$

$$A_2 = (u_2^2 - u_3^2)(i_2^2 - i_4^2) - (u_2^2 - u_4^2)(i_2^2 - i_3^2)$$

$$B_1 = 2(P_1 - P_2)(i_1^2 - i_3^2) - 2(P_1 - P_3)(i_1^2 - i_2^2)$$

$$B_2 = 2(P_2 - P_3)(i_2^2 - i_4^2) - 2(P_2 - P_4)(i_2^2 - i_3^2)$$

$$C_1 = 2(Q_1 - Q_2)(i_1^2 - i_3^2) - 2(Q_1 - Q_3)(i_1^2 - i_2^2)$$

$$C_2 = 2(Q_2 - Q_3)(i_2^2 - i_4^2) - 2(Q_2 - Q_4)(i_2^2 - i_3^2)$$

$$D_1 = \frac{B_1^2 + C_1^2}{B_1^2}(i_1^2 - i_2^2)$$

$$D_2 = \frac{B_2^2 + C_2^2}{B_2^2}(i_2^2 - i_3^2)$$

$$E_1 = \frac{2A_1C_1}{B_1^2}(i_1^2 - i_2^2) - 2\frac{C_1}{B_1}(P_1 - P_2) + 2(Q_1 - Q_2)$$

$$E_2 = \frac{2A_2C_2}{B_2^2}(i_2^2 - i_3^2) - 2\frac{C_2}{B_2}(P_2 - P_3) + 2(Q_2 - Q_3)$$

$$F_1 = (u_1^2 - u_2^2) + \frac{A_1^2}{B_1^2}(i_1^2 - i_2^2) - 2\frac{A_1}{B_1}(P_1 - P_2)$$

$$F_2 = (u_2^2 - u_3^2) + \frac{A_2^2}{B_2^2}(i_2^2 - i_3^2) - 2\frac{A_2}{B_2}(P_2 - P_3)$$

$X_1$ is the reactive resistance of the total impedance for the phasor data sets ZD1 . . . ZD3 and is calculated from:

$$D_1X_1^2 + E_1X_1 + F_1 = 0 \text{ and } X_1 > 0;$$

$X_2$ is the reactive resistance of the total impedance for the phasor data sets ZD2 . . . ZD4 and is calculated from:

$$D_2X_2^2 + E_2X_2 + F_2 = 0 \text{ and } X_2 > 0;$$

the relative change of the reactive resistance is defined by:

$$\Delta X = \left|\frac{(X_1 - X_2)}{X_2}\right|;$$

XO is a predefined upper limit value.

In one embodiment it is specified that XO is set, in particular according to requirements, to a value greater than 15% and/or less than 60% or to 15% or 18% or 20% or 22% or 25% or 30% or 35% or 40% or 45% or 50% or 55% or 60%.

In one embodiment it is specified that:
if the stability criterion is not fulfilled it is determined how much capacitive or inductive reactive power is required in order to fulfil the stability criterion, and an appropriately dimensioned reactive power compensation installation, which is connected with the second alternating current mains, is appropriately controlled; and/or
the required capacitive or inductive reactive power is determined with the help of a load flow calculation or in a different mode and manner; and/or
the reactive power compensation installation includes at least one capacitor bank and/or at least one coil.

In one embodiment it is specified that:
at least one of the load flow calculations is carried out in accordance with the backward-forward-sweep method or the Newton-Raphson method or in another mode and manner; and/or at least one of the target functions is determined with the help of the method of smallest squares or the method of weighted smallest squares or in another mode and manner; and/or at least one of the target functions is minimised with the help of the Levenberg-Marquard method or in another mode and manner;

the alternating current magnitudes are detected in a predetermined cycle and/or the phasor data sets are determined in a predetermined cycle; and/or for each cycle, the cycle time thereof is set, in particular according to requirements, to a value greater than 10 ms or 100 ms or 120 ms or 150 ms and/or to a value smaller than 20 s or to 10 ms or 20 ms or 50 ms or 100 ms or 120 ms or 150 ms or 200 ms or 500 ms or 1 s or 2 s or 5 s or 10 s or 15 s or 20 s; and/or the first alternating current mains is more stable in terms of time than the second alternating current mains; and/or the first alternating current mains lies at a first voltage plane and the second alternating current mains at a second voltage plane lying below the first voltage plane; and/or the phasor data are determined in that the time plots of amperage and voltage at the primary-side and/or secondary-side terminals or connections of the regulating transformer are measured.

In one embodiment of the installation it is specified that:

the installation is constructed in such a way that it performs or can perform at least one of the proposed methods and/or at least one of the forms of embodiment of the method; and/or the control device is constructed in such a way that it performs or can perform at least one of the proposed methods and/or at least one of the forms of embodiment of the method.

One of the method embodiments can, for example, be performed by each of the proposed installations. Each of the proposed installations can, for example, be constructed in such a way and/or serve such a purpose and/or be suitable for such a purpose that it performs and/or can perform one of the proposed methods.

The explanations with respect to one of the aspects of the invention, in particular with respect to individual features of this aspect, also correspondingly apply in analogous manner to the other aspects of the invention.

Forms of embodiment of the invention are explained in more detail in the following, by way of example, with reference to the accompanying drawings. However, the individual features evident therefrom are not limited to the individual forms of embodiment, but can be connected and/or combined with further above-prescribed individual features and/or with individual features of other forms of embodiment. The details in the drawings are to be understood as merely explanatory and not limitative. The reference numerals included in the claims are not to restrict the scope of protection of the invention in any way, but refer merely to the forms of embodiment shown in the drawings.

A preferred embodiment of an electrical installation 10, which couples together a first alternating current mains 11 and a second alternating current mains 12, is schematically illustrated in FIG. 1. The installation 10 includes a regulating transformer 13 with settable translation ratios ü, which is connected between the alternating current mains 11, 12, a measuring device 14, which, for example, includes a current sensor 141 and a voltage sensor 142, a control device 15, which is coupled to the measuring device 14 and the regulating transformer 13, and a reactive power compensation installation 16, which is connected between the regulating transformer 13 and the second alternating current mains 12 and is coupled to the control device 15.

The sensors 141, 142 are coupled to a line, which is attached to one of the output terminals of the regulating transformer 13 on the secondary side thereof, which is connected with the second alternating current mains 12. The current sensor 141 detects the time plot of the amperage i and the voltage sensor 142 detects the time plot of the voltage u. Consequently, the measuring device 14 detects alternating current magnitudes of the second alternating current mains 12 by means of the sensors 141, 142, namely i and u, which are characteristic for the phasor data of the two alternating current mains 11, 12 and from which these phasor data can be determined. However, it is also possible for at least one of the sensors 141, 142 to be coupled to a line which is attached to one of the input terminals of the regulating transformer 13 on the primary side thereof, which is connected with the first alternating current mains 11.

The reactive power compensation installation 16 includes three differently dimensioned capacitor banks, which depending on requirements can be respectively connected by way of a power switch to the second alternating current mains 12 and separated therefrom.

The installation 10 is so constructed that it can perform a preferred form of embodiment of a method for controlling the regulating transformer 13 and/or for influencing or controlling the two alternating current mains 11, 12.

Figure 2:
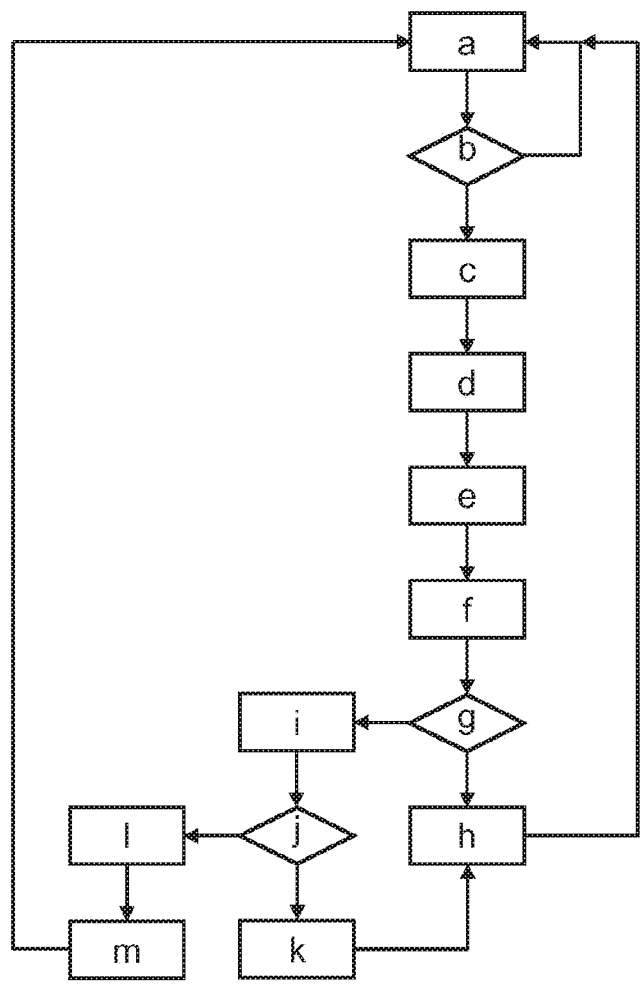
FIG. 2 shows a flow chart of the method of FIG. 1.

A preferred embodiment of the method is schematically illustrated in FIG. 2.

In a step a the control device 15 determines the phasor data from the alternating current magnitudes i, u detected by the measuring device 14.

In a step b the control device 15 monitors the phasor data and, depending on the respective monitoring result, provides with the help of the phasor data a switch-over signal for the regulating transformer 13, which includes a desired translation ratio corresponding with a desired voltage. If the control device 15 does not provide the switch-over signal, then it jumps to step a, but otherwise it executes step c.

In step c the control device 15 determines for the first alternating current mains 11 an equivalent circuit diagram with equivalent circuit diagram parameters.

In step d the control device 15 determines for the second alternating current mains a load model with load model parameters.

In a step e the control device 15 determines the equivalent circuit diagram parameters and the load model parameters from the phasor data.

In a step f the control device 15 predicts for the desired translation ratio a working point A' of the second alternating current mains 12.

In a step g the control device 15 checks for the predicted working point A' a stability criterion in the second alternating current mains 12. If the stability criterion is fulfilled, then the control device 15 performs step h, but otherwise performs step i.

In step h the control device 15 transmits the provided switch-over signal to the regulating transformer 13 and jumps to step a. The regulating transformer 13 after receipt of the switch-over signal switches over to the desired translation ratio.

In step i the control device 15 determines how much reactive power is required in order to fulfill the stability criterion.

In a step j the control device 15 checks whether the reactive power compensation installation 16 can supply the required reactive power. If yes, then it performs step k, but otherwise step l.

In step k the control device 15 transmits to the reactive power compensation installation 16 a switch-off signal containing a desired reactive power which depends on the required reactive power and which the reactive power compensation installation 16 can supply. The reactive power compensation installation 16 after receipt of the switch-off signal separates the capacitor banks, which are required for the desired reactive power, from the second alternating current mains 12. As a result, the feed of capacitive reactive power is reduced and the voltage U drops at the second alternating current mains 12. This reduced feed of capacitive reactive power corresponds with an increased feed of inductive reactive power and the effective factor cos φ of the second alternating current mains 12 is displaced in the direction of 'inductive'. Subsequently, due to the decreased voltage U the control device 15 again determines the phasor data and provides, with the help of this phasor data, a fresh switch-over signal for the regulating transformer 13, which includes a new desired translation ratio corresponding with the desired voltage. It then jumps to step h.

In step l the control device 15 transmits to the reactive power compensation installation 16 a switch-off signal, which contains the maximum reactive power the reactive power compensation installation 16 can supply, and jumps to step h. The reactive power compensation installation 16 after receipt of the switch-off signal separates all capacitor banks from the second alternating current mains 12.

In a step m, the control device 15 generates a warning signal and jumps to step a.

Before the control device 15 can again perform step e, it checks a state change criterion for the state of the first alternating current mains 11. If the state change criterion is fulfilled, then it repeats the determination of the equivalent circuit diagram parameters, but otherwise it takes over the existing equivalent circuit diagram parameters.

For the purpose of this checking of the state change criterion the control device 15 initially defines a total impedance, which describes the first alternating current mains 11 and the regulating transformer 13, by:

$$\underline{Z} = R + jX = \frac{\underline{Z}_{Th} + \underline{Z}_{Trf}}{\ddot{u}^2}$$

where:
$\underline{Z}_{Th}$ is the Thévenin impedance,
$\underline{Z}_{Trf}$ is the impedance of the regulating transformer 13,
R is the effective resistance of the total impedance, and
X is the reactive resistance of the total impedance.

The control device 15 then checks the state change criterion in that it:
calculates from the youngest phasor data set ZD1 and the three preceding phasor data sets ZD2, ZD3 and ZD4 in each instance the voltage $u_i$, the amperage $i_i$, the effective power $P_i$ and the reactive power $Q_i$ (wherein i=1 . . . 4); and
checks whether at least one of the following conditions:

$E_1^2 - 4D_1 F_1 \geq 0$ $\Delta X < XO$ does not apply;
uses the following definitions:

$$A_1 = (u_1^2 - u_2^2)(i_1^2 - i_3^2) - (u_1^2 - u_3^2)(i_1^2 - i_2^2)$$

$$A_2 = (u_2^2 - u_3^2)(i_2^2 - i_4^2) - (u_2^2 - u_4^2)(i_2^2 - i_3^2)$$

$$B_1 = 2(P_1 - P_2)(i_1^2 - i_3^2) - 2(P_1 - P_3)(i_1^2 - i_2^2)$$

$$B_2 = 2(P_2 - P_3)(i_2^2 - i_4^2) - 2(P_2 - P_4)(i_2^2 - i_3^2)$$

$$C_1 = 2(Q_1 - Q_2)(i_1^2 - i_3^2) - 2(Q_1 - Q_3)(i_1^2 - i_2^2)$$

$$C_2 = 2(Q_2 - Q_3)(i_2^2 - i_4^2) - 2(Q_2 - Q_4)(i_2^2 - i_3^2)$$

$$D_1 = \frac{B_1^2 + C_1^2}{B_1^2}(i_1^2 - i_2^2)$$

$$D_2 = \frac{B_2^2 + C_2^2}{B_2^2}(i_2^2 - i_3^2)$$

$$E_1 = \frac{2A_1 C_1}{B_1^2}(i_1^2 - i_2^2) - 2\frac{C_1}{B_1}(P_1 - P_2) + 2(Q_1 - Q_2)$$

$$E_2 = \frac{2A_2 C_2}{B_2^2}(i_2^2 - i_3^2) - 2\frac{C_2}{B_2}(P_2 - P_3) + 2(Q_2 - Q_3)$$

$$F_1 = (u_1^2 - u_2^2) + \frac{A_1^2}{B_1^2}(i_1^2 - i_2^2) - 2\frac{A_1}{B_1}(P_1 - P_2)$$

$$F_2 = (u_2^2 - u_3^2) + \frac{A_2^2}{B_2^2}(i_2^2 - i_3^2) - 2\frac{A_2}{B_2}(P_2 - P_3)$$

where:
$X_1$ is the reactive resistance of the total impedance for the phasor data sets ZD1 . . . ZD3, which it calculates from:

$D_1 X_1^2 + E_1 X_1 + F_1 = 0$ and $X_1 > 0$ $X_2$ is the reactive resistance of the total impedance for the phasor data sets ZD2 . . . ZD4, which it calculates from:

$D_2 X_2^2 + E_2 X_2 + F_2 = 0$ and $X_2 > 0$ $\Delta X$ is the relative change of the reactive resistance, which it calculates from:

$$\Delta X = \left| \frac{(X_1 - X_2)}{X_2} \right|,$$

XO is a predefined upper limit value.

In step c the control device 15 determines the equivalent circuit diagram in that it forms the equivalent circuit diagram according to the Thévenin theorem.

In step e the control device 15 determines the equivalent circuit diagram parameters in that it:
determines and collates a translation ratio and, for a predetermined number M of time instants, the phasor data;
selects for the Thévenin theorem as target function:

$$L = \sum_{k=1}^{M} \left\{ \left( \frac{E_{Th}}{\ddot{u}} \right)^2 - [u_k^2 + 2Z(P_k \cos\vartheta + Q_k \sin\vartheta) + (Z i_k)^2] \right\}^2$$

with the secondary conditions:

$EU \leq E_{Th} \leq EO$, wherein $EU < 1$ and $EO > 1$ $Z > 0$ $TU \leq \tan \vartheta \leq TO$, where:
ü is the translation ratio, which it adopts or assumes as constant,
ZDk is a phasor data set containing the phasor data collated at a k-th time instant (wherein k=1 . . . M),
$P_k$ is the effective power calculated from the phasor data set ZDk,
$Q_k$ is the reactive power calculated from the phasor data set ZDk,
$i_k$ is the amperage which is calculated from the phasor data set ZDk and the amount value of which is indicated in, in particular, the per-unit system,
$u_k$ is the voltage which is calculated from the phasor data set ZDk and the amount value of which is indicated in, in particular, the per-unit system,
$E_{Th}$ is the Thévenin voltage,
a total impedance describing the first alternating current mains (11) and the regulating transformer (13) is defined by:

$$\underline{Z} = Z \cdot e^{j\vartheta} = \frac{\underline{Z}_{Th} + \underline{Z}_{Trf}}{\ddot{u}^2};$$

$\underline{Z}_{Th}$ is the Thévenin impedance;
$\underline{Z}_{Trf}$ is the impedance of the regulating transformer (13);
Z is the apparent impedance of the total impedance;
$\vartheta$ is the phase angle of the total impedance;
Z, $\vartheta$ and $E_{Th}$ are the substitute circuit diagram parameters;
EU and EO are predetermined lower and upper limit values;
TU and TO are predetermined lower and upper limit values;
sets EU to 0.8, EO to 1.2, TU to 5 and TO to 20;
calculates the equivalent circuit diagram parameters by minimisation of the target function with the help of the Levenberg-Marquard method.

In step d the control device 15 determines the load model in that it selects a combined load model.

In step e the control device 15 determines the load model parameters in that it:
determines and collates, for a predetermined number N of switchings-over to a desired translation ratio, the phasor data before and after each of these switchings-over;
selects for the combined load model as first target function:

$$J = \sum_{k=1}^{N} \left\{ \left[ u_{1,k}^{x_4} - \frac{P_{1,k}}{P_{2,k}} u_{2,k}^{x_4} \right] x_1 + \left[ u_{1,k}^{x_5} - \frac{P_{1,k}}{P_{2,k}} u_{2,k}^{x_5} \right] x_2 + \left[ u_{1,k}^{x_6} - \frac{P_{1,k}}{P_{2,k}} u_{2,k}^{x_6} \right] x_3 \right\}^2$$

and as second target function:

$$K = \sum_{k=1}^{N} \left\{ \left[ u_{1,k}^{y_4} - \frac{Q_{1,k}}{Q_{2,k}} u_{2,k}^{y_4} \right] y_1 + \left[ u_{1,k}^{y_5} - \frac{Q_{1,k}}{Q_{2,k}} u_{2,k}^{y_5} \right] y_2 + \left[ u_{1,k}^{y_6} - \frac{Q_{1,k}}{Q_{2,k}} u_{2,k}^{y_6} \right] y_3 \right\}^2$$

with the secondary conditions:

$0 \le x_i \le 1$ and $0 \le y_i \le 1$, wherein $i=1 \ldots 3$ $0 \le x_j$ and $0 \le y_j$, wherein $j=4 \ldots 6$ $x_1+x_2+x_3=y_1+y_2+y_3=1$ where:
$P_{1,k}$ is the effective power, which is calculated from the collated phasor data, before the k-th switching-over process,
$P_{2,k}$ is the effective power, which is calculated from the collated phasor data, after the k-th switching-over process,
$Q_{1,k}$ is the reactive power, which is calculated from the collated phasor data, before the k-th switching-over process,
$Q_{2,k}$ is the reactive power, which is calculated from the collated phasor data, after the k-th switching-over process,
$u_{1,k}$ is the voltage, which is calculated from the collated phasor data, before the k-th switching-over process and the amount value of which is indicated in the per-unit system,
$u_{2,k}$ is the voltage, which is calculated from the collated phasor data, after the k-th switching-over process and the amount value of which is indicated in the per-unit system,
$x_i$, $x_j$, $y_i$, $y_j$ are the respective load model parameters,
calculates the load model parameters by minimisation of the target functions with the help of the Levenberg-Marquard method.

In this embodiment, determination of the load model parameters is carried out only when the predetermined number N of switching-over processes has been reached and thus sufficient phasor data are present. Prior to that, the control device 15 undertakes this determination on the basis of predetermined load model parameters.

Figure 3:
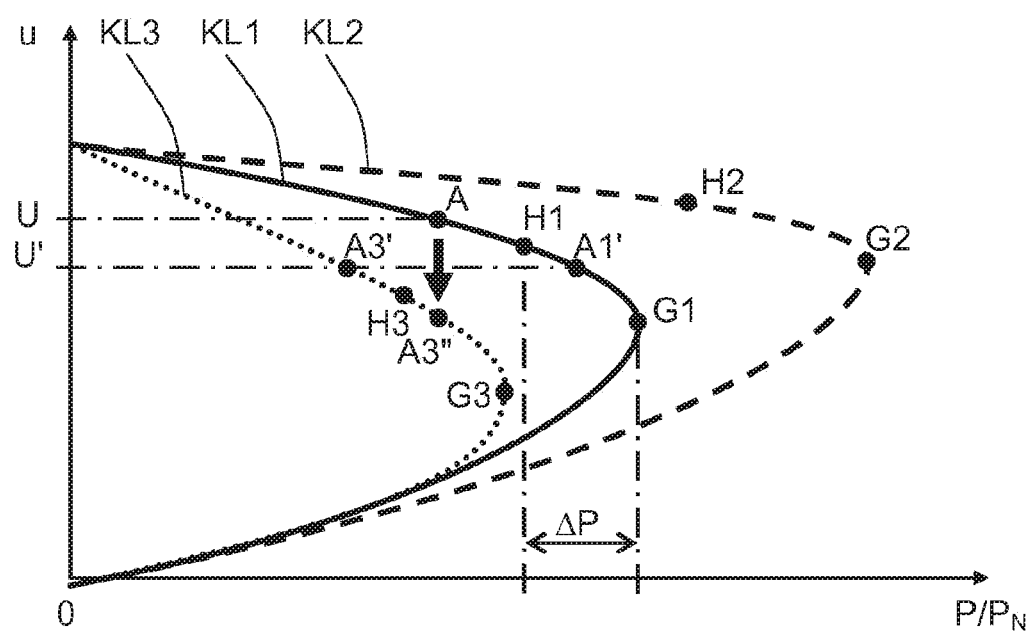
FIG. 3 shows the P-U plot field for the second alternating current mains of FIG. 1.

The P-U characteristic curve field, which combines the P-U plots for different effective factors cos φ, is depicted in FIG. 3. Here, merely three plots are shown, namely a first, solid-line plot KL1 for cos φ=1, a second, dashed-line plot KL2 for cos φ<1 with capacitive load and a third, dotted-line plot KL3 for cos φ<1 with inductive load. Each of these plots has two characteristic points, namely the limit point G1, G2, G3 and the Hopf point H1, H2, H3. The limit effective power $P_G$, which is the largest effective power of the respective plot, lies at the limit point G; there, the second alternating current mains 12 is overloaded. The Hopf effective power $P_H$ lies at the Hopf point; for lower effective powers the second alternating current mains 12 is stable, but unstable at larger effective powers.

If now the instantaneous working point A of the second alternating current mains 12 lies on the first plot KL1 in the stable region on the left of H1 and the control device 15 has to actually reduce the corresponding instantaneous voltage U at the second alternating current mains 12, through switching over the regulating transformer 13 to a desired translation ratio, to such an extent to a desired voltage U' that the working point A1' accordingly predicted by it would lie in the unstable region to the right of H1, then it will initially prevent this switching-over process. In addition, it will then check whether the reactive power compensation installation 16 can supply sufficient reactive power so that the thereby-changed effective factor cow defines a plot which is here, for example, the third plot KL3 and the Hopf point H3 of which lies below the desired voltage U', because in this case the working point A would initially migrate to this third plot KL3 after A3" through the switching-over of the reactive power compensation installation 16 in accordance with the arrow. From there, due to switching-over of the regulating transformer 13 to a new desired translation ratio corresponding with the same desired voltage U' reduced by comparison with the instantaneous voltage U, it would then migrate to a new working point A3' which lay in the stable region of this third plot KL3 to the left of H3. Thus, if this check of the reactive power compensation installation 16 is successful the control device 12 will then appropriately control the reactive power compensation installation 16 and release the switching-over process of the regulating transformer 13, but otherwise it will further prevent switching-over of the regulating transformer 13.

The control device 15 calculates this plot field with the help of a load flow calculation in accordance with the backward-forward-sweep method.

In step f the control device 15 predicts the working point A' with the help of the load flow calculation.

In step g the control device 15 checks the stability criterion in that it:
determines for the instantaneous state of the second alternating current mains 12 a stability margin $$\Delta P = P_G - P_H$$

with the help of the load flow calculation;
checks for the predicted point A' whether:

$$P_G - P' > \Delta P$$

is applicable,
where:
$P_G$ is the limit effective power of the P-U plot;
P' is the effective power of the predicted working point A' and
$P_H$ is the Hopf effective power of the P-U plot.

The following are a list of reference numerals used herein:
10 electrical installation
11 first alternating current mains
12 second alternating current mains
13 regulating transformer
14 measuring device
141/142 current sensor/voltage sensor
15 control device
16 reactive power compensation installation
A instantaneous working point on the P-U plot
A' predicted working point on the P-U plot
$E_{Th}$ Thévenin voltage, equivalent circuit diagram parameters
G limit point of the P-U plot
H Hopf point of the P-U plot
$i_k$ amperage, calculated from ZDk
M number of time instants for determination of the phasor data
N number of switchings-over to a desired ü
$P_k$ effective power, calculated from ZDk
$P_{1,k}$ effective power before the k-th switching-over process
$P_{2,k}$ effective power after the k-th switching-over process
$P_G$ limit effective power of the P-U plot
$P_H$ Hopf effective power of the P-U plot
P' effective power of A'
$\Delta P$ stability margin
$Q_k$ reactive power, calculated from ZDk
$Q_{1,k}$ reactive power before the k-th switching over process
$Q_{2,k}$ reactive power after the k-th switching over process
R effective resistance of $\underline{Z}$
$u_k$ voltage calculated from ZDk
$u_{1,k}$ voltage before the k-th switching over process
$u_{2,k}$ voltage after the k-th switching over process
ü translation ratio of 13
x, $x_i$, $x_j$ load model parameters
X reactive resistance of $\underline{Z}$
y, $y_i$, $y_j$ load model parameters
ZDj phasor data set for a j-th time instant
$\underline{Z}$ total impedance
Z apparent resistance of $\underline{Z}$, equivalent circuit diagram parameters
$\underline{Z}_{Th}$ Thévenin impedance
$\underline{Z}_{Trf}$ impedance of the regulating transformer
ϑ phase angle of $\underline{Z}$, equivalent circuit diagram parameters
cos φ effective factor of 12

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of controlling a regulating transformer with a settable translation ratio, which is capable of being switched between a first alternating current mains and a second alternating current mains, the method comprising:
detecting phasor data of phasors of the first alternating current mains or the second alternating current mains at the regulating transformer;
determining an equivalent circuit diagram with equivalent circuit diagram parameters for the first alternating current mains;
determining a load model with load model parameters for the second alternating current mains;
determining the equivalent circuit diagram parameters and the load model parameters from the phasor data; and
upon determining that switching over to a desired translation ratio is to take place:
predicting a working point of the second alternating current mains for the desired translation ratio;
checking a stability criterion in the second alternating current mains for the predicted working point; and
switching over to the desired translation ratio upon determining that the stability criterion being fulfilled, but otherwise not switching over to the desired translation ratio;
wherein the stability criterion is checked according to the following:
a stability margin ΔP is determined for a current state of the second alternating current mains;

the stability criterion for the predicted working point is determined as fulfilled based upon determining that the condition $P_G-P'>\Delta P$ is satisfied, wherein:

$P_G$ is a limit effective power of a P-U plot for the second alternating current mains;

P' is the effective power of the predicted working point; the stability margin is defined by:

$\Delta P = P_G - P_H$; and $P_H$ is the Hopf effective power of the P-U plot.

2. The method according to claim 1, wherein the equivalent circuit diagram is determined in accordance with the Thévenin theorem or the Norton theorem.

3. The method according to claim 1, wherein the equivalent circuit diagram parameters are determined in that:

the phasor data are determined and collated for a predetermined number M of time instants;

a target function is determined with use of the collated phasor data; and the equivalent circuit diagram parameters are calculated by minimization of the target function.

4. The method according to claim 1, wherein equivalent circuit diagram is determined in accordance with the Thévenin theorem, and wherein for the Thévenin theorem as function:

$$L = \sum_{k=1}^{M} \left\{ \left(\frac{E_{Th}}{\ddot{u}}\right)^2 - [u_k^2 + 2Z(P_k \cos\vartheta + Q_k \sin\vartheta) + (Zi_k)^2] \right\}^2$$

with secondary conditions:

$EU \leq E_{Th} \leq EO$, with $EU<1$ and $EO>1$ $Z>0$ $TU \leq \tan\vartheta \leq TO$ is selected;

ü is the translation ratio;

ZDk is a phasor data set containing the phasor data collated at a k-th time instant (wherein k=1 ... M);

$P_k$ is the effective power calculated from the phasor data set ZDk;

$Q_k$ is the reactive power calculated from the phasor data set ZDk;

$i_k$ is the amperage calculated from the phasor data set ZDk;

$u_k$ is the voltage calculated from the phasor data set ZDk;

$E_{Th}$ is the Thévenin voltage;

a total impedance describing the first alternating current mains and the regulating transformer is defined by:

$$\underline{Z} = Z \cdot e^{j\vartheta} = \frac{\underline{Z}_{Th} + \underline{Z}_{Trf}}{\ddot{u}^2};$$

$\underline{Z}_{Th}$ is the Thévenin impedance;

$\underline{Z}_{Trf}$ is the impedance of the regulating transformer;

Z is the apparent resistance of the total impedance;

$\vartheta$ is the phase angle of the total impedance;

Z, $\vartheta$ and $E_{Th}$ are the equivalent circuit diagram parameters;

EU and EO are predetermined lower and upper limit values;

TU and TO are predetermined lower and upper limit values.

5. The method according to claim 1, wherein:

the load model models the second alternating current mains as a voltage-dependent total load; or the load model describes the effective power and the reactive power of the second alternating current mains in dependence on the applied voltage.

6. The method according to claim 1, wherein the load model is modelled in that:

for a predetermined number N of switching-over processes the phasor data are determined and collated before and after each of these switching-over processes;

a first target function for the effective power and a second target function for the reactive power are determined with use of the collated phasor data; and the load model parameters are calculated by minimization of the target functions.

7. The method according to claim 1, wherein the load model is an exponential load model or a polynomial load model or a combined load model.

8. The method according to claim 7, wherein:

for the first exponential load model there is selected as first target function:

$$J = \sum_{k=1}^{N} \left[\frac{P_{1,k}}{P_{2,k}} - \left(\frac{u_{1,k}}{u_{2,k}}\right)^x\right]^2$$

and as second target function:

$$K = \sum_{k=1}^{N} \left[\frac{Q_{1,k}}{Q_{2,k}} - \left(\frac{u_{1,k}}{u_{2,k}}\right)^y\right]^2$$

with the secondary conditions:

$0 \leq x \leq 2$ $0 \leq y \leq YO$;

for the polynomial load model there is selected as first target function:

$$J = \sum_{k=1}^{N} \left\{ \left[u_{1,k}^2 - \frac{P_{1,k}}{P_{2,k}}u_{2,k}^2\right]x_1 + \left[u_{1,k} - \frac{P_{1,k}}{P_{2,k}}u_{2,k}\right]x_2 + \left[1 - \frac{P_{1,k}}{P_{2,k}}\right]x_3 \right\}^2$$

and as second target function:

$$K = \sum_{k=1}^{N} \left\{ \left[u_{1,k}^2 - \frac{Q_{1,k}}{Q_{2,k}}u_{2,k}^2\right]y_1 + \left[u_{1,k} - \frac{Q_{1,k}}{Q_{2,k}}u_{2,k}\right]y_2 + \left[1 - \frac{Q_{1,k}}{Q_{2,k}}\right]y_3 \right\}^2$$

with the secondary conditions:

$0 \leq x_i \leq 1$ and $0 \leq y_i \leq 1$, wherein $i=1 \ldots 3$ $x_1+x_2+x_3=y_1+y_2+y_3=1$;

for the combined load model there is selected as first target function:

$$J = \sum_{k=1}^{N} \left\{ \left[ u_{1,k}^{x_4} - \frac{P_{1,k}}{P_{2,k}} u_{2,k}^{x_4} \right] x_1 + \left[ u_{1,k}^{x_5} - \frac{P_{1,k}}{P_{2,k}} u_{2,k}^{x_5} \right] x_2 + \left[ u_{1,k}^{x_6} - \frac{P_{1,k}}{P_{2,k}} u_{2,k}^{x_6} \right] x_3 \right\}^2$$

and as second target function:

$$K = \sum_{k=1}^{N} \left\{ \left[ u_{1,k}^{y_4} - \frac{Q_{1,k}}{Q_{2,k}} u_{2,k}^{y_4} \right] y_1 + \left[ u_{1,k}^{y_5} - \frac{Q_{1,k}}{Q_{2,k}} u_{2,k}^{y_5} \right] y_2 + \left[ u_{1,k}^{y_6} - \frac{Q_{1,k}}{Q_{2,k}} u_{2,k}^{y_6} \right] y_3 \right\}^2$$

with the secondary conditions:

$0 \le x_i \le 1$ and $0 \le y_i \le 1$, wherein $i=1 \ldots 3$ $0 \le x_j$ and $0 \le y_j$, wherein $j=4 \ldots 6$ $x_1+x_2+x_3=y_1+y_2+y_3=1$;

$P_{1,k}$ is the effective power, which is calculated from the collated phasor data, before the k-th switching-over process;

$P_{2,k}$ is the effective power, which is calculated from the collated phasor data, after the k-th switching-over process;

$Q_{1,k}$ is the reactive power, which is calculated from the collated phasor data, before the k-th switching-over process;

$Q_{2,k}$ is the reactive power, which is calculated from the collated phasor data, after the k-th switching-over process;

$u_{1,k}$ is the voltage, which is calculated from the collated phasor data, before the k-th switching-over process;

$u_{2,k}$ is the voltage, which is calculated from the collated phasor data, after the k-th switching-over process;

$x$, $x_i$, $x_j$, $y$, $y_i$, $y_j$ are the respective load model parameters; and YO is a predetermined upper limit value.

9. The method according to claim 1, wherein:
the working point is predicted based at least in part on a load flow calculation; or
the stability criterion is checked using the load flow calculation.

10. The method according to claim 1, wherein:
the stability criterion is checked according to the following:
  a stability margin ΔP is determined for an instantaneous state of the second alternating current mains; and
  the stability criterion for the predicted working point is determined as fulfilled based upon determining that the condition $P_G - P' > \Delta P$ is satisfied, wherein:
    $P_G$ is a limit effective power of a P-U plot of the second alternating current mains;
    P' is the effective power of the predicted working point; and
  the stability margin is determined using a load flow calculation.

11. The method according to claim 1, wherein:
a state change criterion for the state of the first alternating current mains is checked;
if the state change criterion is fulfilled, determination of the equivalent circuit diagram parameters is repeated;
a total impedance describing the first alternating current mains and the regulating transformer is defined by:

$$Z = R + jX = \frac{Z_{Th} + Z_{Trf}}{\ddot{u}^2};$$

$Z_{Th}$ is the Thévenin impedance;
$Z_{Trf}$ is the impedance of the regulating transformer;
R is the effective resistance of the total impedance;
X is the reactive resistance of the total impedance;
ZDi is a phasor data set containing the phasor data collated at an i-th time instant;
the state change criterion is checked in that:
  the voltage $u_i$, the amperage $i_i$, the effective power $P_i$ and the reactive power $Q_i$, wherein i=1 . . . 4, are respectively calculated from the youngest phasor data set ZD1 and the three preceding phasor data sets ZD2, ZD3 and ZD4;
  it is checked whether at least one of the following conditions:

$E_1^2 - 4D_1 F_1 \ge 0$ $\Delta X < XO$ is not applicable;
the following definitions are used:

$A_1 = (u_1^2 - u_2^2)(i_1^2 - i_3^2) - (u_1^2 - u_3^2)(i_1^2 - i_2^2)$ $A_2 = (u_2^2 - u_3^2)(i_2^2 - i_4^2) - (u_2^2 - u_4^2)(i_2^2 - i_3^2)$ $B_1 = 2(P_1 - P_2)(i_1^2 - i_3^2) - 2(P_1 - P_3)(i_1^2 - i_2^2)$ $B_2 = 2(P_2 - P_3)(i_2^2 - i_4^2) - 2(P_2 - P_4)(i_2^2 - i_3^2)$ $C_1 = 2(Q_1 - Q_2)(i_1^2 - i_3^2) - 2(Q_1 - Q_3)(i_1^2 - i_2^2)$ $C_2 = 2(Q_2 - Q_3)(i_2^2 - i_4^2) - 2(Q_2 - Q_4)(i_2^2 - i_3^2)$ $D_1 = \frac{B_1^2 + C_1^2}{B_1^2}(i_1^2 - i_2^2)$ $D_2 = \frac{B_2^2 + C_2^2}{B_2^2}(i_2^2 - i_3^2)$ $E_1 = \frac{2 A_1 C_1}{B_1^2}(i_1^2 - i_2^2) - 2\frac{C_1}{B_1}(P_1 - P_2) + 2(Q_1 - Q_2)$ $E_2 = \frac{2 A_2 C_2}{B_2^2}(i_2^2 - i_3^2) - 2\frac{C_2}{B_2}(P_2 - P_3) + 2(Q_2 - Q_3)$ $F_1 = (u_1^2 - u_2^2) + \frac{A_1^2}{B_1^2}(i_1^2 - i_2^2) - 2\frac{A_1}{B_1}(P_1 - P_2)$ $F_2 = (u_2^2 - u_3^2) + \frac{A_2^2}{B_2^2}(i_2^2 - i_3^2) - 2\frac{A_2}{B_2}(P_2 - P_3);$ $X_1$ is the reactive resistance of the total impedance for the phasor data sets ZD1 . . . ZD3 and is calculated from:

$D_1 X_1^2 + E_1 X_1 + F_1 = 0$ and $X_1 > 0$;

$X_2$ is the reactive resistance of the total impedance for the phasor data sets ZD2 . . . ZD4 and is calculated from:

$D_2 X_2^2 + E_2 X_2 + F_2 = 0$ and $X_2 > 0$;

the relative change of the reactive resistance is defined by:

$$\Delta X = \left| \frac{(X_1 - X_2)}{X_2} \right|;$$

and

XO is a predefined upper limit value.

12. The method according to claim 1, wherein based upon the stability criterion not being fulfilled, it is determined how much reactive power is required in order to fulfil the stability criterion and an appropriately dimensioned reactive power compensation installation connected with the second alternating current mains is controlled.

13. The method according to claim 1, wherein the stability criterion is checked in dependence on the first derivation U'(P) or on the amount of the first derivation |U'(P)| or on the second derivation U"(P) or on the amount of the second derivation |U"(P)| of the P-U plot.

14. An electrical installation for coupling two alternating current mains, the electrical installation comprising:
a regulating transformer with a settable translation ratio, which is configured to be switched between a first alternating current mains and a second alternating current mains;
a measuring device configured to detect, at the regulating transformer, alternating current magnitudes of the first alternating current mains or the second alternating current mains; and
a control device coupled to the measuring device and the regulating transformer, wherein the control device is configured such that it:
  determines phasor data of phasors of the first alternating current mains or second alternating current mains from the alternating current magnitudes;
  determines for the first alternating current mains an equivalent circuit diagram with equivalent circuit diagram parameters;
  determines for the second alternating current mains a load model with load model parameters;
  determines the equivalent circuit diagram parameters and the load model parameters from the phasor data;
  monitors the phasor data and, based on the respective monitoring result, provides, in association with the phasor data, a switch-over signal comprising a desired translation ratio; and
  based upon the switch-over signal being provided:
    predicts a working point of the second alternating current mains for the desired translation ratio;
    checks a stability criterion in the second alternating current mains for the predicted working point; and
    transmits the switch-over signal to the regulating transformer when the stability criterion is fulfilled, but otherwise does not transmit the switch-over signal,
wherein the control device is configured such that the stability criterion is checked according to the following:
  a stability margin $\Delta P$ is determined for the current state of the second alternating current mains, the stability margin $\Delta P$ being defined as $\Delta P = P_G - P_H$, with $P_H$ being the Hopf effective power of a P-U plot of the second alternating current mains;
  the stability criterion for the predicted working point is determined as fulfilled upon determining that the condition $P_G - P' > \Delta P$ is fulfilled, otherwise the stability criterion is determined as unfulfilled, $P_G$ being a limit effective power of the P-U plot, and P' being the effective power of the predicted working point.

* * * * *